(12) United States Patent
Toda

(10) Patent No.: US 11,586,343 B2
(45) Date of Patent: Feb. 21, 2023

(54) DISPLAY DEVICE, IMAGE PROCESSING APPARATUS, DISPLAY METHOD AND NON-TRANSITORY COMPUTER READABLE MEDIUM STORING PROGRAM FOR ENSURING CONFIRMATION OF DESIGNATED POSITION ON DISPLAY DEVICE

(71) Applicant: FUJIFILM BUSINESS INNOVATION CORP., Tokyo (JP)

(72) Inventor: Tsuyoshi Toda, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 43 days.

(21) Appl. No.: 16/931,875

(22) Filed: Jul. 17, 2020

(65) Prior Publication Data
US 2020/0348832 A1    Nov. 5, 2020

Related U.S. Application Data

(63) Continuation of application No. 15/466,064, filed on Mar. 22, 2017, now abandoned.

(30) Foreign Application Priority Data

Dec. 22, 2016    (JP) ............................. JP2016-248953

(51) Int. Cl.
G06F 3/0484    (2022.01)
G06F 3/04847    (2022.01)
(Continued)

(52) U.S. Cl.
CPC ........ G06F 3/04847 (2013.01); G06F 3/0482 (2013.01); G06F 3/04883 (2013.01)

(58) Field of Classification Search
None
See application file for complete search history.

(56) References Cited

U.S. PATENT DOCUMENTS 7,853,972 B2 * 12/2010 Brodersen .......... H04N 7/17318
725/40
8,245,156 B2    8/2012 Mouilleseaux et al.
(Continued)

FOREIGN PATENT DOCUMENTS

JP    2014-217642 A    11/2014
JP    2015-033081 A    2/2015
(Continued)

OTHER PUBLICATIONS

Oct. 25, 2018 Office Action issued in U.S. Appl. No. 15/466,064.
(Continued)

*Primary Examiner* — Matthew Ell
*Assistant Examiner* — Samuel Shen
(74) *Attorney, Agent, or Firm* — Oliff PLC

(57) ABSTRACT

A display device includes a display unit and a display controller. The display unit displays a screen including a displayed item. When the displayed item is moved toward a designated position on the screen, when designation of the moving is terminated in a state where the displayed item and the designated position are separated by a distance longer than a predetermined distance, the display controller continuously displays the screen until the displayed item and the designated position at a time of terminating the designation come within the predetermined distance, or displays a setting screen about setting based on an operation by an operator.

8 Claims, 10 Drawing Sheets

(51) Int. Cl.
    *G06F 3/0482*     (2013.01)
    *G06F 3/04883*    (2022.01)

(56)           References Cited

U.S. PATENT DOCUMENTS

| | | | |
|---|---|---|---|
| 8,643,616 | B1 | 2/2014 | Zhang et al. |
| 9,390,349 | B2 | 7/2016 | Awano et al. |
| 9,678,571 | B1 * | 6/2017 | Robert .................. G06F 3/0488 |
| 9,888,973 | B2 | 2/2018 | Olson et al. |
| 2009/0113330 | A1 | 4/2009 | Garrison et al. |
| 2012/0242633 | A1 * | 9/2012 | Kim ........................ G09G 3/20 |
| | | | 345/207 |
| 2013/0179781 | A1 | 7/2013 | Nan et al. |
| 2014/0104648 | A1 | 4/2014 | Shinosaki et al. |
| 2016/0041725 | A1 | 2/2016 | Iwata |
| 2016/0269455 | A1 * | 9/2016 | Casey ................ H04N 21/8455 |
| 2016/0357281 | A1 | 12/2016 | Fleizach et al. |
| 2017/0364233 | A1 * | 12/2017 | Cai ..................... G06F 3/04855 |
| 2018/0232116 | A1 | 8/2018 | Reilly |

FOREIGN PATENT DOCUMENTS

| | | |
|---|---|---|
| JP | 2015-182603 A | 10/2015 |
| JP | 2016-019116 A | 2/2016 |

OTHER PUBLICATIONS

Mar. 21, 2019 Office Action issued in U.S. Appl. No. 15/466,064.
Aug. 19, 2019 Office Action issued in U.S. Appl. No. 15/466,064.
Feb. 21, 2020 Office Action Issued in U.S. Appl. No. 15/466,064.
Sep. 1, 2020 Office Action issued in Japanese Patent Application No. 2016-248953.

* cited by examiner

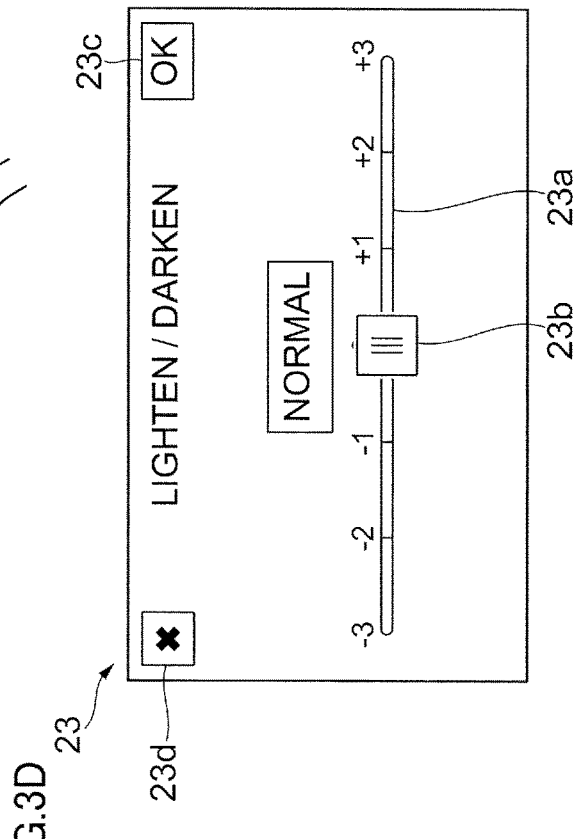
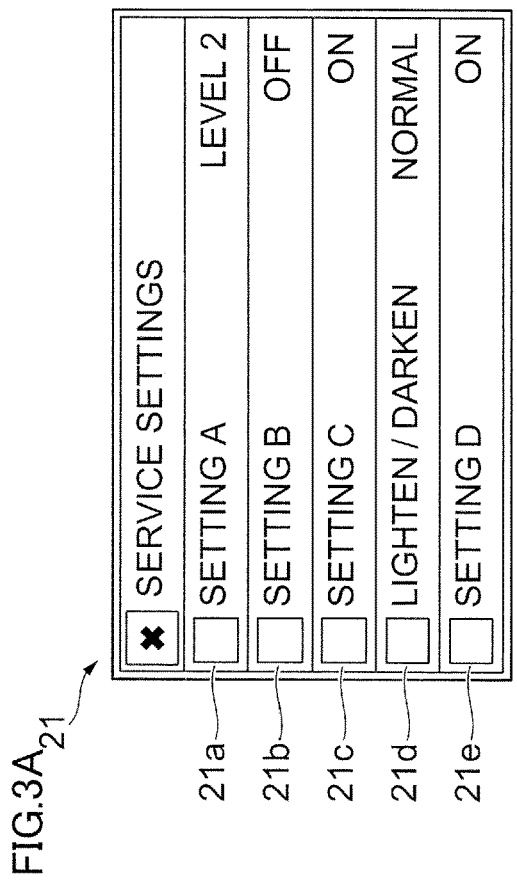
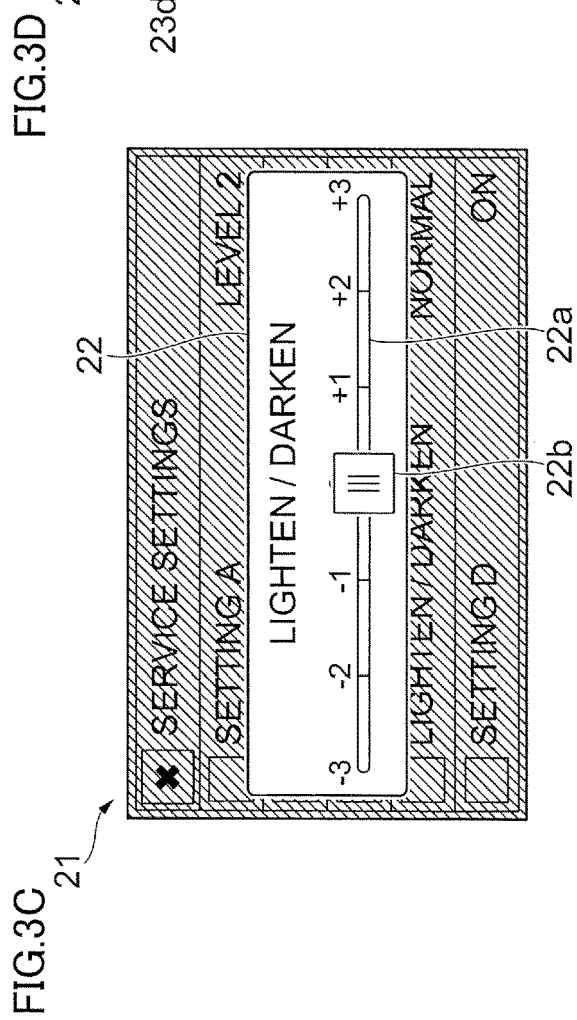

DISPLAY DEVICE, IMAGE PROCESSING APPARATUS, DISPLAY METHOD AND NON-TRANSITORY COMPUTER READABLE MEDIUM STORING PROGRAM FOR ENSURING CONFIRMATION OF DESIGNATED POSITION ON DISPLAY DEVICE

CROSS REFERENCE TO RELATED APPLICATIONS

This application is a continuation of U.S. patent application Ser. No. 15/466,064 filed on Mar. 22, 2017 which is based on and claims priority under 35 USC § 119 from Japanese Patent Application No. 2016-248953 filed Dec. 22, 2016.

BACKGROUND

Technical Field

The present invention relates to a display device, an image processing apparatus, a display method and a non-transitory computer readable medium storing a program.

Related Art

In recent years, many display devices or other devices have touch panels to accept touch operations by operators.

SUMMARY

According to an aspect of the present invention, there is provided a display device including: a display unit that displays a screen including a displayed item; and a display controller that, in moving the displayed item toward a designated position on the screen, when designation of the moving is terminated in a state where the displayed item and the designated position are separated by a distance longer than a predetermined distance, performs control to continuously display the screen until the displayed item and the designated position at a time of terminating the designation come within the predetermined distance, or a setting screen about setting based on an operation by an operator is displayed.

BRIEF DESCRIPTION OF THE DRAWINGS

An exemplary embodiment of the present invention will be described in detail based on the following figures, wherein:

FIGS. 3A to 3D are diagrams for illustrating a specific example of processing for displaying a setting screen in a first form or a setting screen in a second form;

DETAILED DESCRIPTION

Hereinafter, an exemplary embodiment according to the present invention will be described in detail with reference to attached drawings.

<Hardware Configuration of Image Processing Apparatus>

Figure 1:
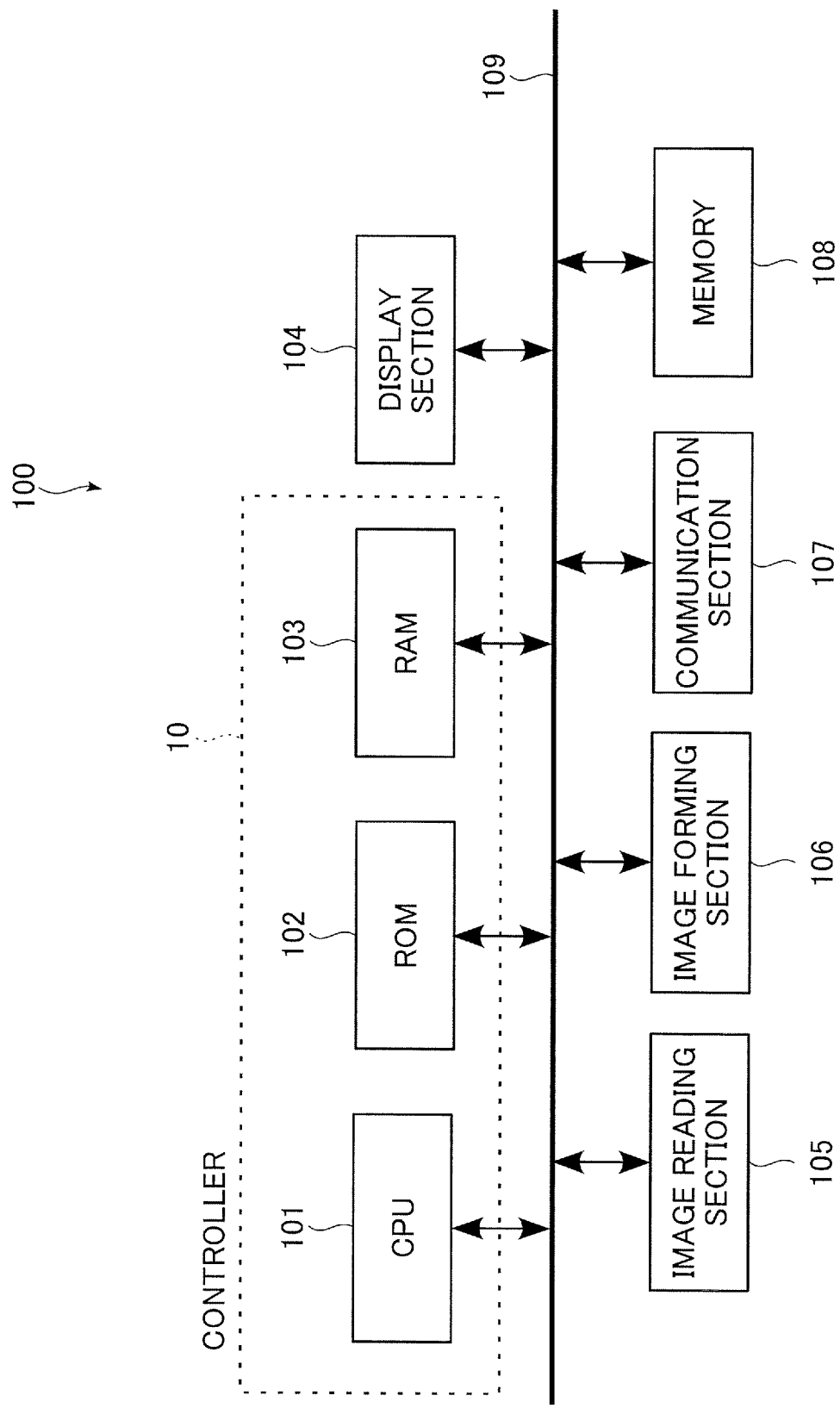
FIG. 1 is a diagram showing a hardware configuration example of an image processing apparatus according to the exemplary embodiment.

First, a hardware configuration of an image processing apparatus 100 to which the exemplary embodiment according to the present invention is applied will be described. FIG. 1 is a diagram showing the hardware configuration example of the image processing apparatus 100 according to the exemplary embodiment. The image processing apparatus 100, as an example of a display device, is a so-called multifunction machine including an image processing function, such as, for example, a scanning function, a printing function, a copying function and a facsimile function. As shown in FIG. 1, the image processing apparatus 100 includes: a controller 10; a display section 104; an image reading section 105; an image forming section 106; a communication section 107; and a memory 108. Note that the respective functional sections are connected to a bus 109, and performs data transmission and reception via the bus 109.

The controller 10 controls each section of the image processing apparatus 100. The controller 10 is configured with a CPU (Central Processing Unit) 101, a ROM (Read Only Memory) 102 and a RAM (Random Access Memory) 103.

Here, the CPU 101 executes various kinds of programs, such as an OS (Operating System) or applications. Moreover, the ROM 102 is a memory that stores a control program executed by the CPU 101. The RAM 103 is a memory used as a working memory or the like for the CPU 101. Then, the CPU 101 reads the control program stored in the ROM 102 and executes the control program using the RAM 103 as a work area. When the control program is executed by the CPU 101, each function in the image processing apparatus 100 is implemented.

The display section 104, as an example of a display unit, is configured with, for example, a liquid crystal touch panel display, and displays data related to, for example, the image processing apparatus 100 under the control of the controller 10. Moreover, the display section 104 displays a screen for receiving operation from an operator, and receives the operation from the operator through the screen. As a measure for detecting the contact, anything, such as a measure for detecting based on a pressure caused by the contact, or a measure for detecting based on static electricity of a contact item, may be used.

Note that, in the following description, an operation performed by contact of an operator's finger with the screen will be described as a contact operation; however, a contact operation by an operator is not limited to an operation by a finger, and the operation may be performed by, for example, a touch pen or others held by the operator.

The image reading section 105, as an example of an image processor, reads an image formed on a document, and creates image data indicating the read image. Here, the image reading section 105 is, for example, a scanner, in which a CCD system that reduces reflected light of light emitted to a document from a light source by a lens and receives the reduced reflected light by a CCD (Charge Coupled Devices), a CIS system that receives reflected light of light sequentially emitted to a document from an LED light source by a CIS (Contact Image Sensor), or the like may be employed.

The image forming section 106, as an example of an image processor, includes a print mechanism that forms an image on a recording medium, such as a sheet. Here, the image forming section 106 is, for example, a printer, and a printer of an electrophotographic system that forms an image by transferring toner attached to a photoreceptor onto a recording medium or a printer of an ink jet system that forms an image by ejecting ink onto a sheet may be used.

The communication section 107 is connected to a not-shown communication line and functions as a communication interface that performs transmission and reception of various kinds of data with other devices connected to the communication line. For example, via the communication section 107, transmission and reception of image data with other devices are performed.

The memory 108 includes a storage region, such as a hard disk device, and stores, for example, data received by the communication section 107 or data created by the image processing apparatus 100.

<Functional Configuration of Controller>

Figure 2:
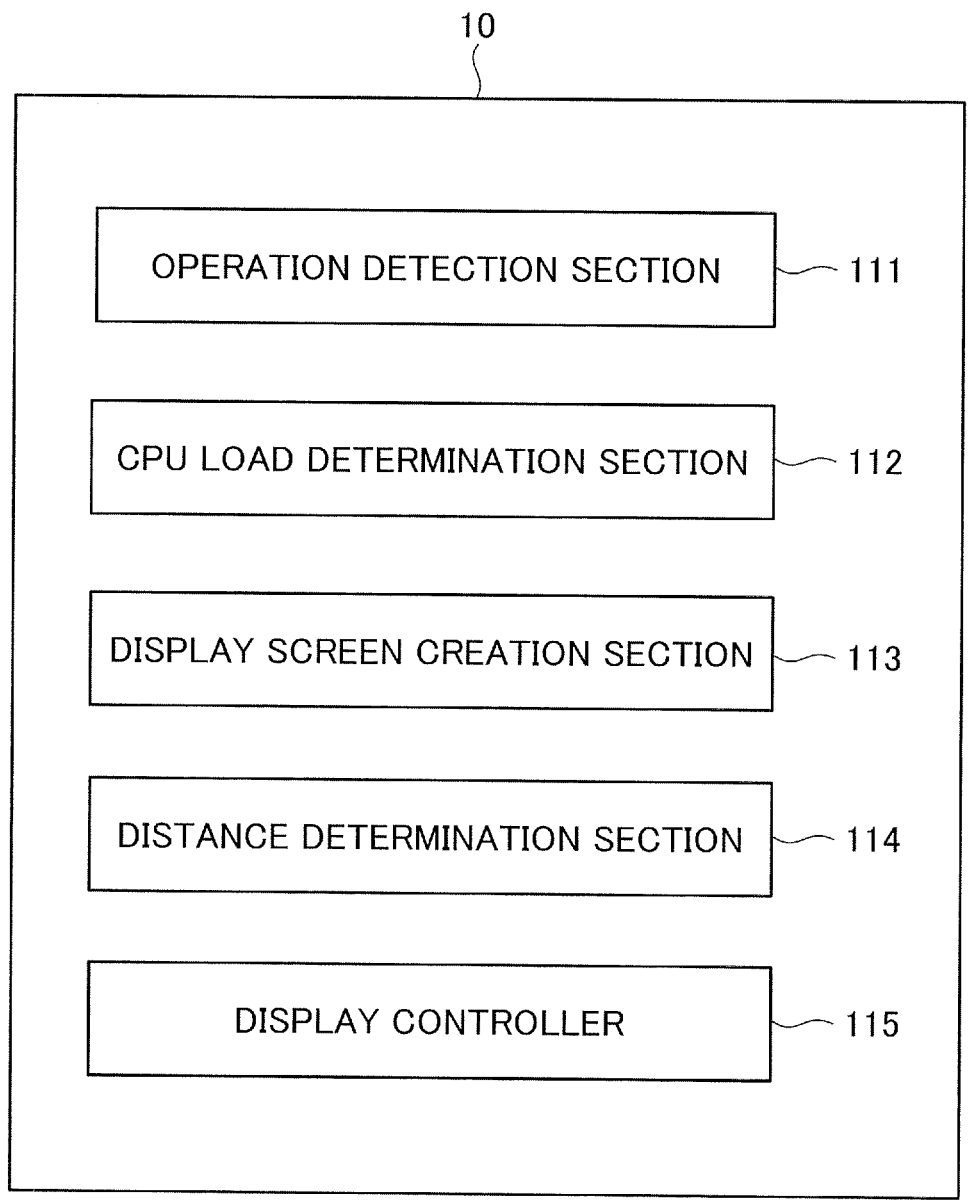
FIG. 2 is a block diagram showing a functional configuration example of a controller included in the image processing apparatus according to the exemplary embodiment.

Next, a functional configuration of the controller 10 included in the image processing apparatus 100 according to the exemplary embodiment will be described. FIG. 2 is a block diagram showing a functional configuration example of the controller 10 included in the image processing apparatus 100 according to the exemplary embodiment. The controller 10 includes: an operation detection section 111; a CPU load determination section 112; a display screen creation section 113; a distance determination section 114; and a display controller 115.

The operation detection section 111 detects contact operation by an operator on a screen of the display section 104 and accepts operation input from the operator. Here, for example, the operation detection section 111 assumes that an orthogonal coordinate system exists on the display section 104, and when an operator's finger contacts the display section 104, the operation detection section 111 detects the coordinates of the contact point. Then, based on the detected coordinates, the operation detection section 111 determines the type of the contact operation by the operator, and accepts operation input from the operator. As the contact operation to be determined, for example, "tap", "drag" or others are shown. "Tap" is an operation in which an operator's finger touches a screen as if the finger lightly strikes the screen. "Drag" is an operation in which an operator moves his/her finger while the operator's finger is in touch with the screen.

The CPU load determination section 112 determines whether or not the load of the CPU 101 (how much load is applied to the CPU 101) satisfies a predetermined condition. To put it another way, the CPU load determination section 112 determines whether or not the load of the CPU 101 exceeds a predetermined threshold value. More specifically, the CPU load determination section 112 makes determination about the load of the CPU 101 when the operation detection section 111 detects a specific operation by an operator. As the specific operation, for example, an operation to select a specific image displayed on a screen (for example, an operation to "tap" a specific image) can be shown.

Moreover, as the load of the CPU 101, for example, CPU utilization (CPU loading factor), that is, a value indicating percentages of a program running in the image processing device 100 occupying the processing time of the CPU 101, is used. As the predetermined threshold value, for example, "80%" of the CPU utilization can be shown.

Moreover, as a case in which the load on the CPU 101 is large, to put it another way, as a case in which the load on the CPU 101 is larger than the predetermined threshold value, for example, a case in which processing for image data is performed in the image processing apparatus 100 can be shown. As the case in which processing for image data is performed, for example, a case in which reading processing (scanning processing) of a document is performed in the image reading section 105, a case in which print processing of a document is performed in the image forming section 106, or others, can be provided.

The display screen creation section 113 creates a setting screen in response to the load of the CPU 101. More specifically, the display screen creation section 113 creates a setting screen in a second form when the CPU load determination section 112 has determined that the load of the CPU 101 exceeds a predetermined threshold value. Moreover, the display screen creation section 113 creates a setting screen in a first form when the CPU load determination section 112 has determined that the load of the CPU 101 is not more than a predetermined threshold value.

Here, the setting screen in the first form refers to, in moving a displayed item toward a position on a screen designated by an operator, a screen that accepts input of setting and is switched (cleared) when a designating operation by the operator is terminated, in other words, when the operator removes his/her finger from the screen. On the other hand, the setting screen in the second form refers to, in moving a displayed item toward a position on a screen designated by an operator, a screen that accepts input of setting and is switched (cleared) upon further accepting an operation to confirm setting contents from the operator after a designating operation by the operator is terminated.

To additionally describe, in the setting screen in the first form, input of setting is accepted by designation on the screen and removal of a finger by an operator; however, in the setting screen in the second form, input of setting is accepted by a further operation on the screen after designation on the screen by an operator and removal of his/her finger. In this way, in the setting screen in the second form, an operator is required more operation procedures than in the setting screen in the first form.

On the other hand, the setting screen in the first form is displayed, for example, to overlap an existing screen that has already been displayed in conjunction with the existing screen; however, the setting screen in the second form is newly displayed, for example, as a screen different from an existing screen without considering positional relationship with the existing screen. Therefore, in the setting screen in the second form, the load on the CPU 101 related to the display is smaller than in the setting screen in the first form.

When an operator starts a designating operation on the setting screen in the first form, the distance determination section 114 observes a distance between the position designated by the operator and the displayed item. Then, when designation of moving for the displayed item is terminated, in other words, when the operator's finger is removed from the screen, the distance determination section 114 determines whether or not a designated position when the designation by the operator is terminated (hereinafter, referred to as a designated position upon termination) and the displayed item are in a state of being separated by a distance longer than a predetermined distance. The determination result will be used, to be described later, in display control of the display controller 115.

Moreover, when the operator starts designating operation on the setting screen in the second form, the distance determination section 114 also observes a distance between a position designated by the operator and a displayed item in a similar manner. Then, when an operation to confirm setting contents (a setting operation) is performed on the setting screen in the second form after the designation of moving for the displayed item is terminated, the distance determination section 114 determines whether or not the displayed item and the designated position upon termination are in a state of being separated by a distance longer than a predetermined distance. The determination result will be used, to be described later, in display control of the display controller 115.

The display controller 115, as an example of a display controller, outputs data for causing a touch panel display of the display section 104 to display an image, to thereby control the display on the display section 104. For example, when the operation to "drag" is performed, the display controller 115 controls the display on the display section 104 to move a displayed item toward a designated position designated by an operator (to follow a designated position). Moreover, for example, when the setting screen in the first form or the setting screen in the second form is created by the display screen creation section 113, the display controller 115 displays the created setting screen in the first form or setting screen in the second form on the display section 104.

Further, after displaying the setting screen in the first form or the setting screen in the second form, the display controller 115 controls the display on the display section 104 in response to the determination result of the distance determination section 114.

First, processing in the setting screen in the first form will be described. When it is determined by the distance determination section 114 that the displayed item and the designated position upon termination are in the state of being separated by a distance longer than the predetermined distance in the setting screen in the first form, the display controller 115 continues displaying of the setting screen in the first form until the displayed item and the designated position upon termination come within the predetermined distance. Then, when the displayed item and the designated position upon termination come within the predetermined distance, the display controller 115 switches (clears) the setting screen in the first form.

Here, it may be possible that, when it is determined that the displayed item and the designated position upon termination are in a state of being separated by a distance longer than the predetermined distance, the display controller 115 is configured to continue to display the setting screen in the first form until a screen showing setting contents set by designation from an operator or a screen for accepting input of setting by an operator is displayed.

Note that the screen showing setting contents set by designation from the operator or the screen for accepting input of setting by the operator is used as an example of a setting screen about setting based on an operation by an operator.

Next, processing in the setting screen in the second form will be described. In the setting screen in the second form, the display controller 115 subsequently moves the displayed item toward the designated position upon termination even after designation by the operator is terminated. Then, when an operation to confirm the setting contents is performed and it is determined by the distance determination section 114 that the displayed item and the designated position upon termination are in the state of being separated by a distance longer than the predetermined distance in the setting screen in the second form, the display controller 115 continues display of the setting screen in the second form until the displayed item and the designated position upon termination come within the predetermined distance. Then, when the displayed item and the designated position upon termination come within the predetermined distance, the display controller 115 switches (clears) the setting screen in the second form.

Here, it may be possible that, when it is determined that the displayed item and the designated position upon termination are in a state of being separated by a distance longer than the predetermined distance, similar to the case in which the setting screen in the first form is displayed, the display controller 115 is configured to continue to display the setting screen in the second form until a screen showing setting contents set by designation from the an operator or a screen for accepting input of setting by an operator is displayed.

Note that each functional section constituting the controller 10 of the image processing apparatus 100 shown in FIG. 2 is implemented by cooperation of software and hardware resources. Specifically, the CPU 101 reads the programs for implementing the operation detection section 111, the CPU load determination section 112, the display screen creation section 113, the distance determination section 114, the display controller 115 and the like, for example, from the ROM 102 into the RAM 103 and executes thereof, and accordingly, these functional sections are implemented.

<Description of Processing for Displaying Setting Screen in First Form or Setting Screen in Second Form>

Next, processing for displaying the setting screen in the first form or the setting screen in the second form will be described while taking a specific example. FIGS. 3A to 3D are diagrams for illustrating the specific example of processing for displaying the setting screen in the first form or the setting screen in the second form.

First, it is assumed that a screen 21 shown in FIG. 3A is displayed on the display section 104. The screen 21 is a screen for performing setting about image processing. On the screen 21, images 21a to 21e are provided as images corresponding to five setting items, "Setting A", "Setting B", "Setting C", "Lighten/Darken" and "Setting D", respectively.

Here, as shown in FIG. 3B, it is assumed that the image 21d of "Lighten/Darken" is selected by an operator from among the five setting items. Specifically, when the operator's finger touches the image 21d of "Lighten/Darken" as if to lightly strike thereof, the operation detection section 111 detects the operation of "tap" on the image 21d of "Lighten/Darken" and accepts selection of the image 21d.

When the operation detection section 111 accepts selection of the image 21d, the CPU load determination section 112 obtains information indicating the load of the CPU 101

(CPU utilization). Then, the CPU load determination section 112 determines whether or not the load of the CPU 101 exceeds a predetermined threshold value. When the load of the CPU 101 exceeds the predetermined threshold value, the display screen creation section 113 creates the setting screen in the second form. Then, the display controller 115 displays the created setting screen in the second form. On the other hand, when the load of the CPU 101 is not more than the predetermined threshold value, the display screen creation section 113 creates the setting screen in the first form. Then, the display controller 115 displays the created setting screen in the first form.

FIG. 3C is a diagram showing another specific example of the setting screen in the first form. In the specific example shown in the figure, a screen 22 is the setting screen in the first form. The screen 22 performs setting about "Lighten/Darken", and is displayed to overlap the screen 21 that has already been displayed. More specifically, the screen 22 includes a slider 22a and a knob 22b. In the slider 22a, as a setting value (setting item) of "Lighten/Darken", scale marks "+3", "+2", "+1", "0", "−1", "−2" and "−3" are provided. Moreover, at the time of displaying the screen 22, the knob 22b exists at a position of the scale mark "0".

For example, when an operator points the knob 22b positioned at the scale mark "0" and moves his/her finger while pointing the knob 22b, the knob 22b also moves toward the designated position. For example, assuming that an operator removes his/her finger from the screen in a state in which the operator moves his/her finger to the position of "+3" and the knob 22b also moves to the position of "+3" to follow the finger. In this case, an input for setting "+3" for "Lighten/Darken" is performed, the screen 22 is cleared and the screen 21 is displayed to be visually recognized.

FIG. 3D is a diagram showing another specific example of the setting screen in the second form. In the specific example shown in the figure, a screen 23 is the setting screen in the second form. Similar to the screen 22, the screen 23 also performs setting about "Lighten/Darken". The screen 23 is displayed as a screen different from the screen 21 that has already been displayed. Note that the screen 23 may be displayed to overlap the screen 21 or not to overlap the screen 21. More specifically, the screen 23 includes a slider 23a and a knob 23b. In the slider 23a, similar to the slider 22a, as a setting value (setting item) of "Lighten/Darken", scale marks "+3", "+2", "+1", "0", "−1", "−2" and "−3" are provided. Moreover, at the time of displaying the screen 23, the knob 23b exists at a position of the scale mark "0".

For example, when an operator points the knob 23b positioned at the scale mark "0" and moves his/her finger while pointing the knob 23b, the knob 23b also moves toward the designated position. For example, assuming that an operator removes his/her finger from the screen and selects (presses) a confirmation button 23c after the operator moves his/her finger to the position of "+3" and the knob 23b also moves to the position of "+3" to follow the finger. In this case, an input for setting "+3" for "Lighten/Darken" is performed, the screen 23 is cleared and the screen 21 is displayed to be visually recognized.

Here, when an operation to cancel the setting made by a designating operation is not performed within a predetermined time after the designating operation is terminated on the setting screen in the second form, it may be possible to perform processing on the assumption that an operation to confirm the setting contents has been accepted. In the specific example shown in FIG. 3D, when an operation to cancel the setting of "+3" for "Lighten/Darken" is not performed within a predetermined time after terminating the designating operation, processing is performed on the assumption that the confirmation button 23c has been selected. In other words, the operation detection section 111 accepts the setting input of "+3" and the display controller 115 clears the screen 23. Note that, as the operation to cancel the setting made by the designating operation, for example, an operation to select a cancel button 23d shown in FIG. 3D can be provided.

<Procedures in Processing for Displaying Setting Screen in First Form or Setting Screen in Second Form>

Figure 4:
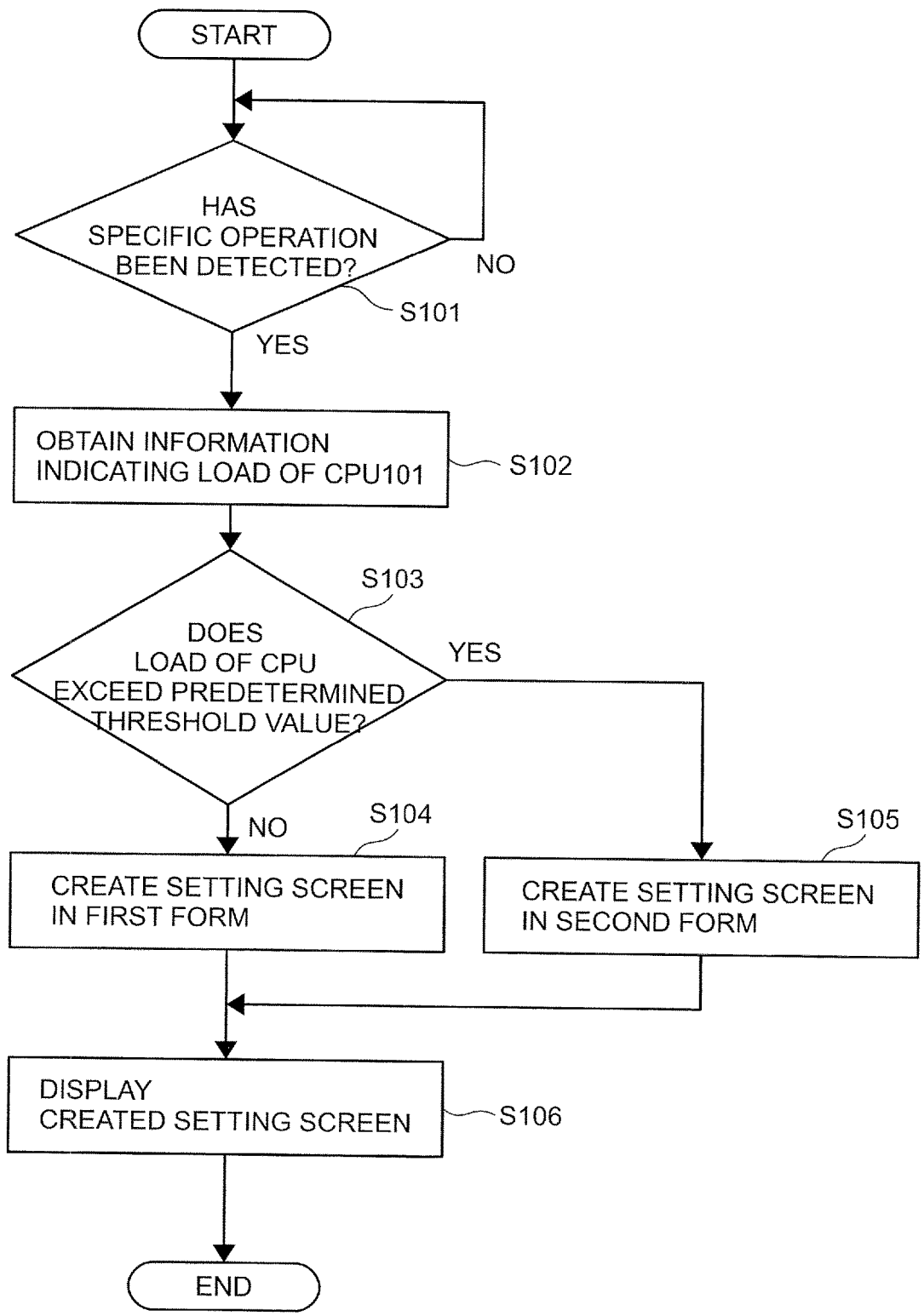
FIG. 4 is a flowchart showing a specific example of procedures in processing for displaying the setting screen in the first form or the setting screen in the second form.

Next, procedures in processing for displaying the setting screen in the first form or the setting screen in the second form will be described. FIG. 4 is a flowchart showing a specific example of procedures in processing for displaying the setting screen in the first form or the setting screen in the second form.

First, the operation detection section 111 determines whether or not a specific operation by an operator is detected (step 101). Here, the specific operation refers to an operation by which an operator selects a specific setting item, such as, for example, the images 21a to 21e shown in FIG. 3A. When any specific operation is not detected (No in step 101), determination in step 101 is subsequently performed. On the other hand, when a specific operation is detected (Yes in step 101), the CPU load determination section 112 obtains information indicating the load of the CPU 101 (CPU utilization) (step 102). Next, the CPU load determination section 112 determines whether or not the load of the CPU 101 exceeds a predetermined threshold value (step 103).

When it is determined that the load of the CPU 101 is not more than the predetermined threshold value (No in step 103), the display screen creation section 113 creates the setting screen in the first form (step 104). On the other hand, when it is determined that the load of the CPU 101 exceeds the predetermined threshold value (Yes in step 103), the display screen creation section 113 creates the setting screen in the second form (step 105). Next, the display controller 115 performs control to display the created setting screen, that is, the setting screen in the first form or the setting screen in the second form (step 106). Then, the processing flow is ended.

For example, when the load of the CPU 101 of the image processing apparatus 100 is large, it takes time to reflect the designating operation of the operator on the screen in some cases. Therefore, for example, moving of the displayed item, such as the knob 22b or the knob 23b, cannot be on time and moving of the displayed item to the position designated by an operator is delayed in some cases. For example, if moving of the displayed item is delayed and designation is terminated in the state in which the displayed item has not moved to the position designated by the operator and then the screen is switched, it can be considered that it is difficult for the operator to distinguish on which position the setting is performed, the position designated by the operator, or the position of the displayed item. Here, for example, due to the specification of the image processing apparatus 100, if the operator recognizes that the setting is performed at the position of the displayed item despite that the setting is actually performed at the position designated by the operator, the operator is led to misrecognition about the setting. Moreover, for example, due to the specification of the image processing apparatus 100, if the operator recognizes that the setting is performed at the position designated by him/her despite that the setting is actually performed at the position of the displayed item, the operator is also led to misrecognition about the setting.

Therefore, the image processing apparatus 100 related to the exemplary embodiment displays the setting screen in the second form when the load of the CPU 101 is larger than the predetermined threshold value. In the setting screen in the second form, there are more operation procedures than in the setting screen in the first form, but the load on the CPU 101 is smaller. For example, an operator may perform an operation to confirm the setting contents after confirming that the displayed item has moved to the designated position on the screen. On the other hand, the image processing apparatus 100 displays the setting screen in the first form when the load of the CPU 101 is not more than the predetermined threshold value. In the setting screen in the first form, there are less operation procedures than in the setting screen in the second form, and thereby the operation procedures of the operator are simplified.

However, even though the setting screen in the first form is displayed when the load of the CPU 101 is not more than the predetermined threshold value, for example, if the operator performs the designating operation fast, it can be considered that the moving of the displayed item is delayed, and thereby the designation is terminated in the state where the displayed item has not moved to the position designated by the operator. Moreover, even though the setting screen in the second form is displayed when the load of the CPU 101 is larger than the predetermined threshold value, for example, it can be considered that the operator performs the operation to confirm the setting contents in the state where the displayed item has not moved to the position designated by the operator. In these cases, there is a possibility that it is difficult for the operator to distinguish on which position the setting is performed, the position designated by the operator, or the position of the displayed item; accordingly, the operator is led to misrecognition about the setting.

Therefore, the image processing apparatus 100 related to the exemplary embodiment observes the distance between the position designated by the operator and the displayed item. Then, when the designation of moving is terminated in a state where the designated position and the displayed item are separated by a distance longer than the predetermined distance, the image processing apparatus 100 controls so that displaying of the setting screen in the first form or the setting screen in the second form is continued until the displayed item and the designated position upon termination come within the predetermined distance. Alternatively, the image processing apparatus 100 performs control to continue displaying of the setting screen in the first form or the setting screen in the second form until a screen showing setting contents set by designation from an operator or a screen for accepting input of setting by an operator is displayed.

Note that, in the above-described example, the CPU load determination section 112 determines whether or not the load of the CPU 101 exceeds the predetermined threshold value, and according to the determination result, the setting screen in the first form or the setting screen in the second form is displayed; however, there is no limitation to such a configuration. The image processing apparatus 100 related to the exemplary embodiment may display the setting screen in the first form or the setting screen in the second form regardless of the load of the CPU 101, in other words, without measuring the load of the CPU 101 but in accordance with predetermined rules about display of the screen. Then, even when the setting screen in the first form or the setting screen in the second form is displayed without measuring the load of the CPU 101, it may be possible to observe the distance between the position designated by the operator and the displayed item (to perform determination processing by the distance determination section 114), to thereby control the display of the screen.

<Description of Processing in Setting Screen in First Form>

A description will be given of the processing in the setting screen in the first form by taking a specific example. FIGS. 5A to 5D are diagrams for illustrating a specific example of the processing in the setting screen in the first form. Here, the description will be given on the assumption that the processing is performed on the screen 22 shown in FIG. 3C.

Figure 5:
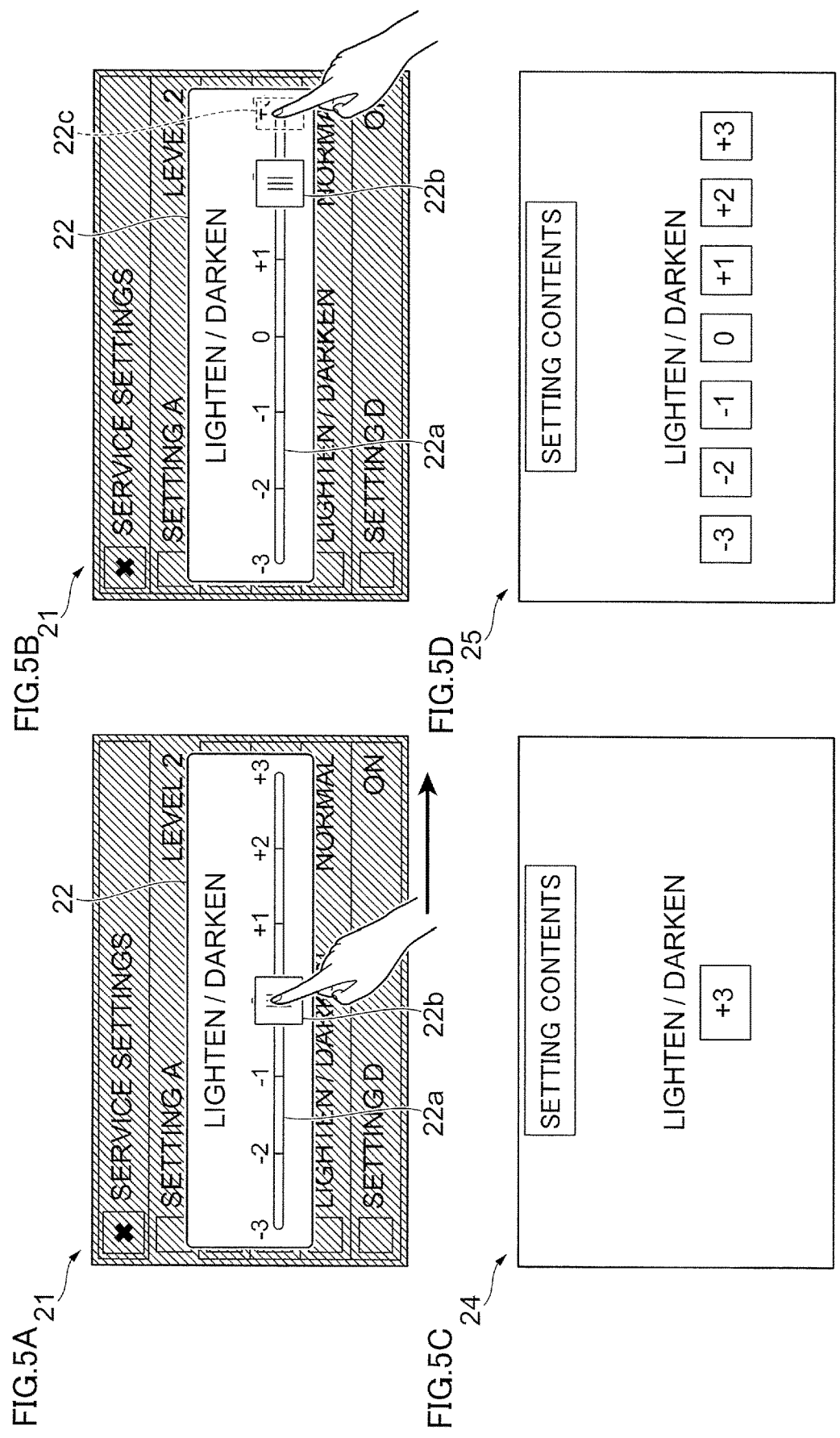
FIGS. 5A to 5D are diagrams for illustrating a specific example of processing in the setting screen in the first form.

First, as shown in FIG. 5A, for example, when an operator moves his/her finger in the direction of the arrow in the state where the operator's finger is in touch with the knob 22b on the screen 22, the display controller 115 performs control to move the knob 22b toward the designated position of the finger. Next, when the operator terminates the designating operation (that is, when the operator removes his/her finger from the screen 22), the distance determination section 114 measures the distance between the designated position upon termination and the knob 22b. Then, the distance determination section 114 determines whether or not the designated position upon termination and the knob 22b are in a state of being separated by a distance longer than a predetermined distance.

Here, when the designated position upon termination and the knob 22b are within the predetermined distance, as has been described in FIG. 3C, the operation detection section 111 accepts the input of setting corresponding to the designated position upon termination (that is, setting corresponding to the position of the knob 22b when the designation is terminated). Moreover, the display controller 115 clears the screen 22 and displays the screen 21 to be visually recognized. Note that the state where the designated position and the displayed item are within the predetermined distance means, for example, a state where the displayed item has moved to the designated position.

On the other hand, in the specific example shown in FIG. 5B, a designated position upon termination 22c and the knob 22b are in a state of being separated by a distance longer than a predetermined distance. In such a case, the display controller 115 performs control to continue display of the screen 22 until the designated position upon termination 22c and the knob 22b are brought into the state within the predetermined distance, that is, until the knob 22b has moved to the designated position upon termination 22c. Then, when the knob 22b moves toward the designated position upon termination 22c by the control of the display controller 115 and thereby the designated position upon termination 22c and the knob 22b come within the predetermined distance, the operation detection section 111 accepts the input of setting corresponding to the designated position upon termination 22c (that is, setting corresponding to the position of the knob 22b after moving). Moreover, the display controller 115 clears the screen 22 and displays the screen 21 to be visually recognized.

Further, it may be possible that, when the designation of moving is terminated in a state where the designated position upon termination 22c and the knob 22b are in a state of being separated by a distance longer than the predetermined distance, the display controller 115 may newly display a screen showing setting contents set by designation from an operator or a screen for accepting input of setting by an operator.

More specifically, when the designation of moving is terminated in a state where the designated position upon termination 22c and the knob 22b are in a state of being separated by a distance longer than the predetermined distance, the display controller 115 displays, as shown in FIG. 5C, a screen 24 showing setting contents corresponding to the designated position upon termination 22c. The screen 24 shows that the setting of "+3" that is a setting value corresponding to the designated position upon termination 22c is performed with respect to "Lighten/Darken". To additionally describe, the operation detection section 111 accepts input of the setting "+3" for "Lighten/Darken". Moreover, the display controller 115 may clear the screen 22 at the timing of displaying the screen 24, or display the screen 24 to overlap the screen 22 and clear the screen 22 and the screen 24 after a predetermined time has passed.

Note that, in the specific example shown in FIG. 5C, the screen 24 that shows the setting contents corresponding to the designated position upon termination 22c is displayed; however, due to the specification of the image processing apparatus 100, it can be considered that the setting corresponding not to the designated position upon termination 22c, but to the position of the displayed item, is performed. In such a case, on the screen 24, the setting contents corresponding to the position of the displayed item at the time of displaying the screen 24 (in the specific example shown in FIG. 5B, the position of "+2") is shown.

Further, when the designation of moving is terminated in a state where the designated position upon termination 22c and the knob 22b are in a state of being separated by a distance longer than the predetermined distance, the display controller 115 displays, for example, as shown in FIG. 5D, a screen 25 for accepting input of setting by the operator. The screen 25 accepts selection of any of setting values "−3" to "+3" for "Lighten/Darken". The display controller 115, for example, may clear the screen 22 at the timing of displaying the screen 25, display the screen 25 to overlap the screen 22, or clear the screen 22 and the screen 25 at the timing of accepting the input of the setting value on the screen 25. Note that the configuration is not limited to the one like the screen 25 in which selection is made from among plural setting values; for example, a screen to which a value that an operator wants to set is actually inputted may be displayed.

Note that, in the specific examples shown in FIGS. 5A to 5D, it is assumed that an operator points the knob 22b positioned at the scale mark "0" and moves the knob 22b to follow the moving of the designated position; however, the configuration is not limited thereto. For example, when an operator first points a position where the knob 22b does not exist (for example, the position of "+2"), the knob 22b is also controlled to move toward the designated position. Then, based on the determination result of the distance determination section 114, display control is performed.

<Procedures in Processing in Setting Screen in First Form>

Figure 6:
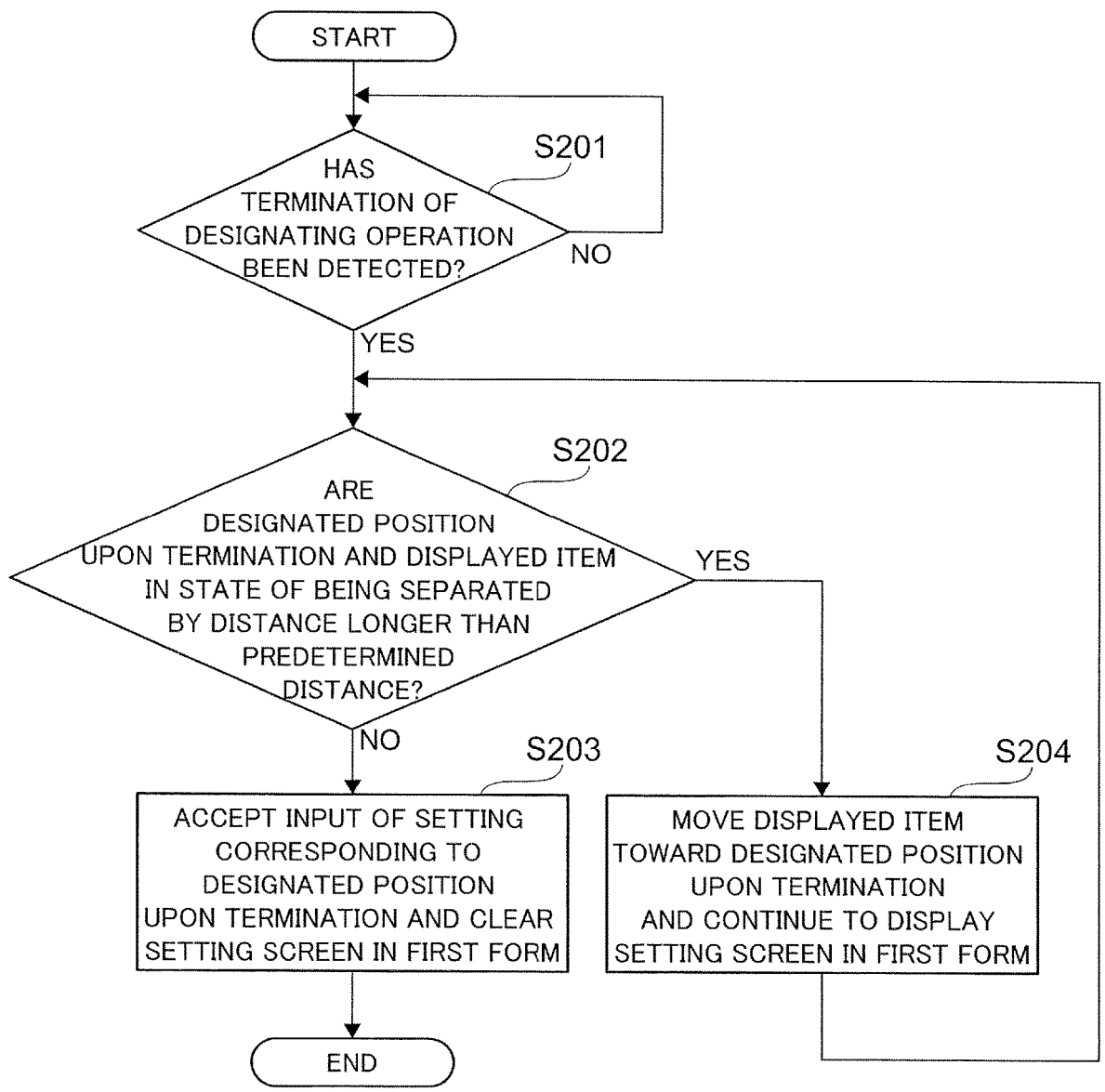
FIG. 6 is a flowchart showing a specific example of procedures in processing in the setting screen in the first form.

Next, procedures in processing in the setting screen in the first form will be described. FIG. 6 is a flowchart showing a specific example of procedures in processing in the setting screen in the first form.

First, the operation detection section 111 determines whether or not termination of the designating operation to move the displayed item to the designated position is detected in the setting screen in the first form (step 201). When termination of the designating operation is not detected (No in step 201), determination in step 201 is subsequently performed. On the other hand, when termination of the designating operation is detected (Yes in step 201), the distance determination section 114 determines whether or not the designated position upon termination and the displayed item are in a state of being separated by a distance longer than a predetermined distance (step 202).

When it is determined that the designated position upon termination and the displayed item are within the predetermined distance (No in step 202), the operation detection section 111 accepts input of the setting corresponding to the designated position upon termination and the display controller 115 clears the setting screen in the first form (step 203). Then, the processing flow is ended.

On the other hand, when it is determined, in step 202, that the designated position upon termination and the displayed item are in a state of being separated by a distance longer than the predetermined distance (Yes in step 202), the operation detection section 115 moves the displayed item toward the designated position upon termination and continues displaying of the setting screen in the first form (step 204). Then, the process proceeds to step 202. In this manner, the display controller 115 continues to display the setting screen in the first form until the designated position upon termination and the displayed item come within the predetermined distance. When the designated position upon termination and the displayed item come within the predetermined distance (that is, negative (No) determination is made in step 202), the process proceeds to step 203.

Moreover, in step 202, the display controller 115 may also display a screen showing setting contents set by designation from an operator, as the screen 24 shown in FIG. 5C, or a screen for accepting input of setting by an operator, as the screen 25 shown in FIG. 5D, instead of waiting for until the designated position upon termination and the displayed item come into a state within the predetermined distance.

Further, in step 202, when the designated position upon termination and the displayed item do not come into a state within the predetermined distance though a predetermined time has passed, the display controller 115 may display the screen 24 or the screen 25.

<Description of Processing in Setting Screen in Second Form>

Figure 7A:
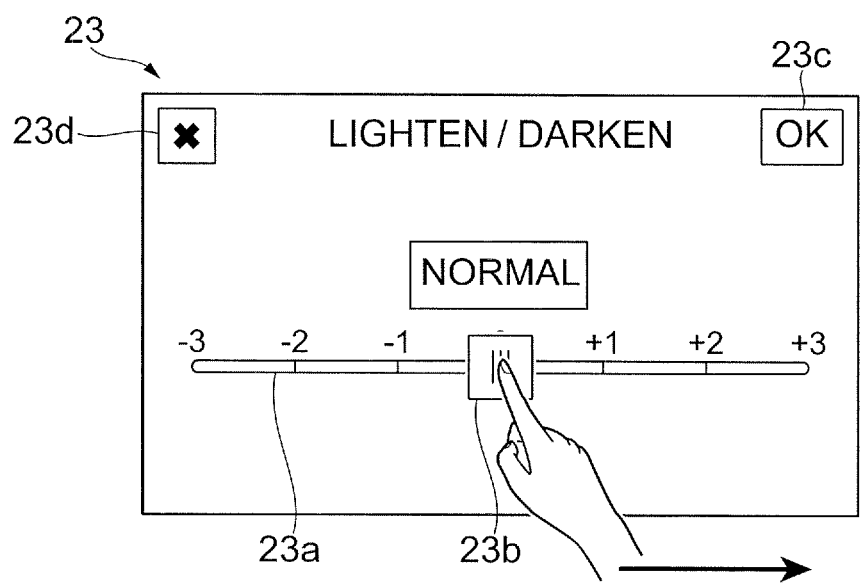
FIGS. 7A and 7B are diagrams for illustrating a specific example of processing in the setting screen in the second form.
Figure 7B:
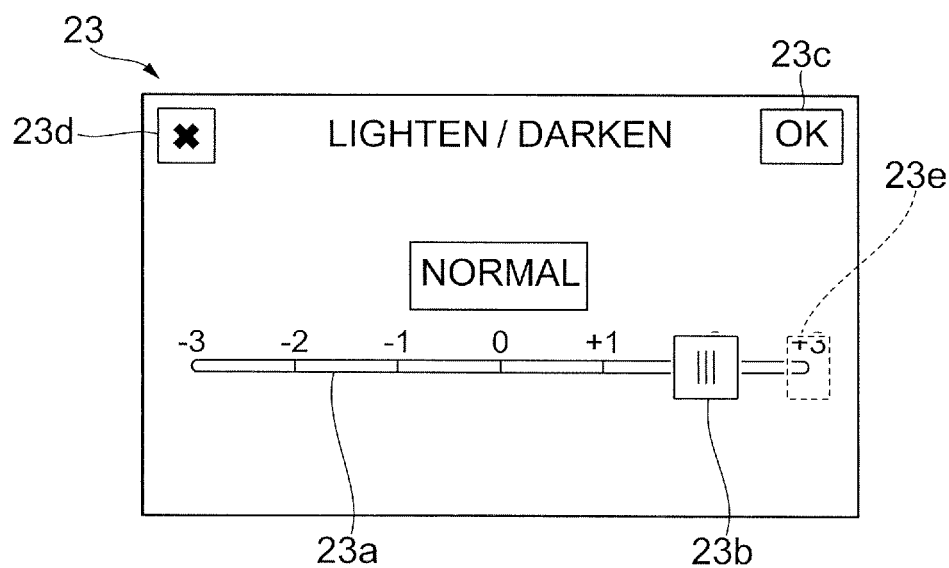

Next, a description will be given of the processing in the setting screen in the second form by taking a specific example. FIGS. 7A and 7B are diagrams for illustrating a specific example of processing in the setting screen in the second form. Here, the description will be given on the assumption that the processing is performed on the screen 23 shown in FIG. 3D.

First, as shown in FIG. 7A, for example, when an operator moves his/her finger in the direction of the arrow in the state where the operator's finger is in touch with the knob 23b on the screen 23, the display controller 115 performs control to move the knob 23b toward the designated position of the finger. The display controller 115 subsequently moves the displayed item toward the designated position upon termination even after the operator terminates the designating operation.

Next, when the confirmation button 23c is selected, the distance determination section 114 measures the distance between the designated position upon termination and the knob 23b. Then, the distance determination section 114 determines whether or not the designated position upon termination and the knob 23b are in a state of being separated by a distance longer than a predetermined distance. Here, when the designated position upon termination and the knob 23b are within the predetermined distance, as has been described in FIG. 3D, the operation detection section 111 accepts the input of setting corresponding to the designated position upon termination (that is, setting corresponding to the position of the knob 23b when the confirmation button 23c is selected). Moreover, the display controller 115 clears the screen 23 and displays the screen 21 to be visually recognized.

On the other hand, in the specific example shown in FIG. 7B, a designated position upon termination 23e and the knob 23b are in a state of being separated by a distance longer than a predetermined distance. In such a case, the display controller 115 performs control to continue display of the screen 23 until the designated position upon termination 23e and the knob 23b are brought into the state within the predetermined distance. Then, when the knob 23b moves toward the designated position upon termination 23e by the control of the display controller 115 and thereby the designated position upon termination 23e and the knob 23b come within the predetermined distance, the operation detection section 111 accepts the input of setting corresponding to the designated position upon termination 23e (that is, setting corresponding to the position of the knob 23b after moving). Moreover, the display controller 115 clears the screen 23 and displays the screen 21 to be visually recognized.

Further, when the confirmation button 23c is selected in a state where the designated position upon termination 23e and the knob 23b are in a state of being separated by a distance longer than the predetermined distance, similar to the case in which the setting screen in the first form is displayed, the display controller 115 may display a screen showing setting contents set by designation from an operator, as the screen 24 shown in FIG. 5C. In this case, the display controller 115 may clear the screen 23 at the timing of displaying the screen 24, or display the screen 24 to overlap the screen 23 and clear the screen 23 and the screen 24 after a predetermined time has passed.

Moreover, the display controller 115 may display, not the screen 24, but the screen for accepting input of setting by an operator, as the screen 25 shown in FIG. 5D. In this case, the display controller 115, for example, may clear the screen 23 at the timing of displaying the screen 25, display the screen 25 to overlap the screen 23, or clear the screen 23 and the screen 25 at the timing of accepting the input of the setting value on the screen 25.

Note that, in the specific examples shown in FIGS. 7A and 7B, it is assumed that an operator points the knob 23b positioned at the scale mark "0" and moves the knob 23b to follow the moving of the designated position; however, the configuration is not limited thereto. For example, when an operator first points a position where the knob 23b does not exist (for example, the position of "+2"), the knob 23b is also controlled to move toward the designated position. Then, based on the determination result of the distance determination section 114, display control is performed.

Moreover, when an operation to cancel the setting made by a designating operation is not performed within a predetermined time after the designating operation is terminated on the setting screen in the second form, the distance determination section 114 may determine the distance between the designated position upon termination and the displayed item on the assumption that an operation to confirm the setting contents has been accepted.

<Procedures in Processing in Setting Screen in Second Form>

Figure 8:
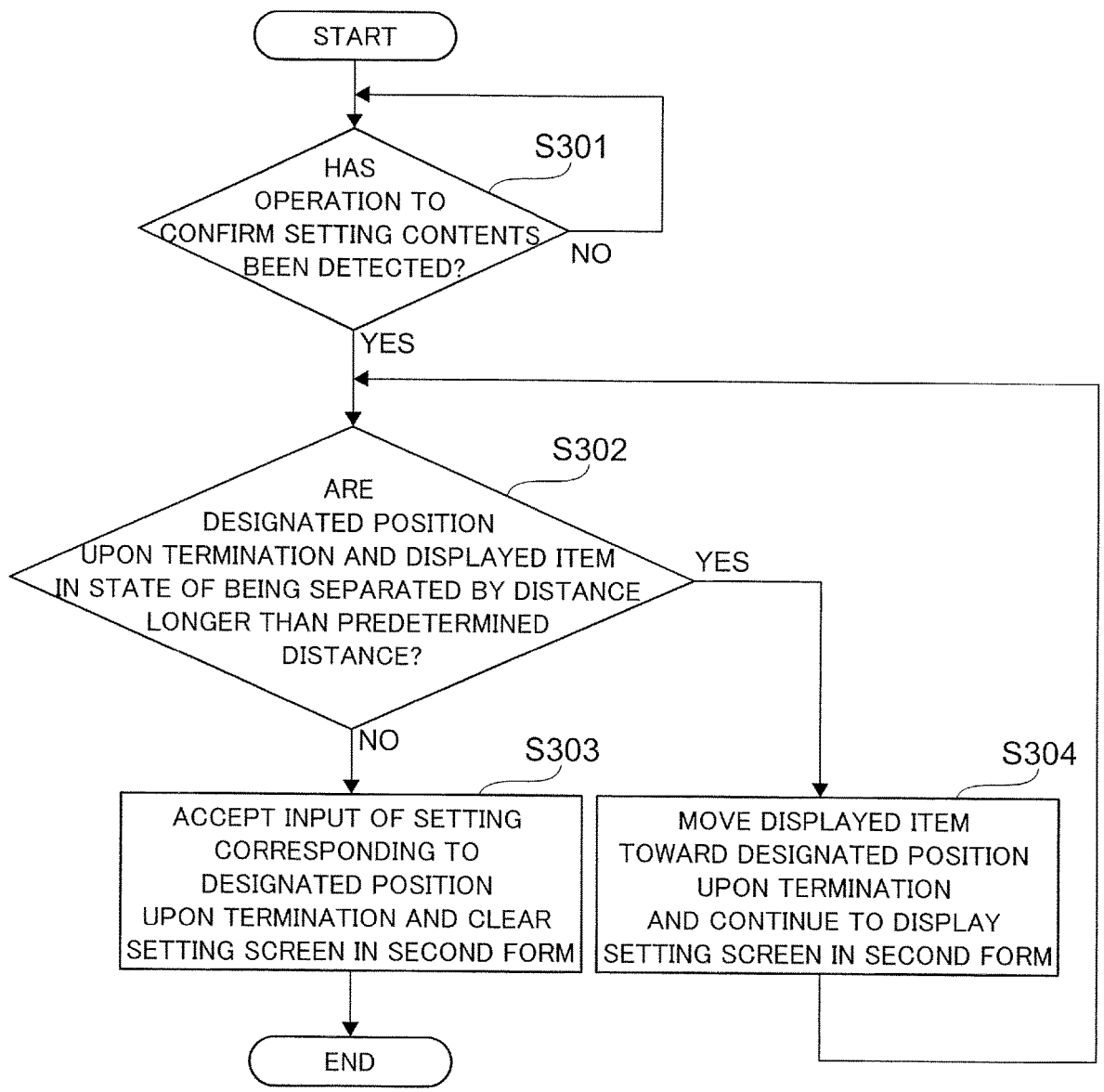
FIG. 8 is a flowchart showing a specific example of procedures in processing in the setting screen in the second form.

Next, procedures in processing in the setting screen in the second form will be described. FIG. 8 is a flowchart showing a specific example of procedures in processing in the setting screen in the second form.

First, the display controller 115, in the setting screen in the second form, subsequently moves the displayed item toward the designated position upon termination even after the designating operation to move the displayed item to the designated position is terminated. Then, the operation detection section 111 determines whether or not an operation to confirm the setting contents is detected (step 301). When any operation to confirm the setting contents is not detected (No in step 301), determination in step 301 is subsequently performed. On the other hand, when the operation to confirm the setting contents is detected (Yes in step 301), the distance determination section 114 determines whether or not the designated position upon termination and the displayed item are in a state of being separated by a distance longer than a predetermined distance (step 302). When it is determined that the designated position upon termination and the displayed item are within the predetermined distance (No in step 302), the operation detection section 111 accepts input of the setting corresponding to the designated position upon termination and the display controller 115 clears the setting screen in the second form (step 303). Then, the processing flow is ended.

On the other hand, when it is determined, in step 302, that the designated position upon termination and the displayed item are in a state of being separated by a distance longer than the predetermined distance (Yes in step 302), the operation detection section 115 moves the displayed item toward the designated position upon termination and continues to display the setting screen in the second form (step 304). Then, the process proceeds to step 302. In this manner, the display controller 115 continues to display the setting screen in the second form until the designated position upon termination and the displayed item come within the predetermined distance. When the designated position and the displayed item come within the predetermined distance (that is, negative (No) determination is made in step 302), the process proceeds to step 303.

Moreover, in step 302, the display controller 115 may also display a screen showing setting contents set by designation from an operator, as the screen 24 shown in FIG. 5C, or a screen for accepting input of setting by an operator, as the screen 25 shown in FIG. 5D, instead of waiting for until the designated position upon termination and the displayed item come into a state within the predetermined distance.

Further, in step 302, when the designated position upon termination and the displayed item do not come into a state within the predetermined distance though a predetermined time has passed, the display controller 115 may display the screen 24 or the screen 25.

<Other Specific Examples of Setting Screen in First Form and Setting Screen in Second Form>

Figure 9A:
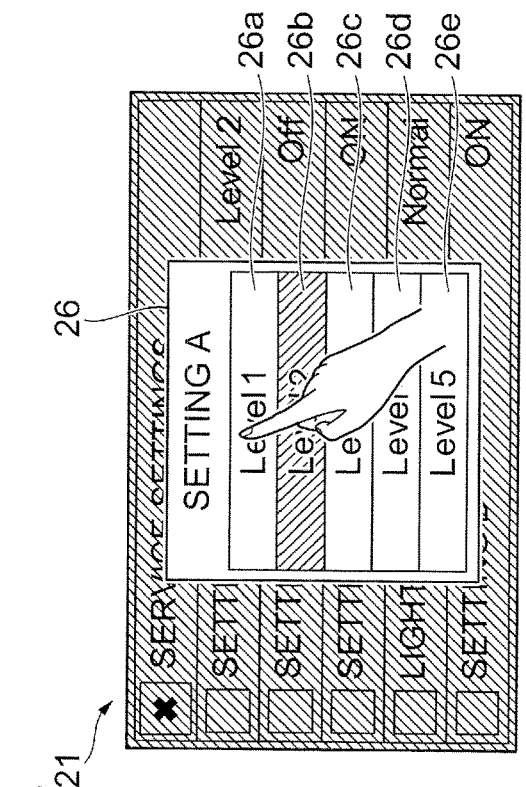
FIGS. 9A and 9B are diagrams showing another specific example of the setting screen in the first form.
Figure 9B:
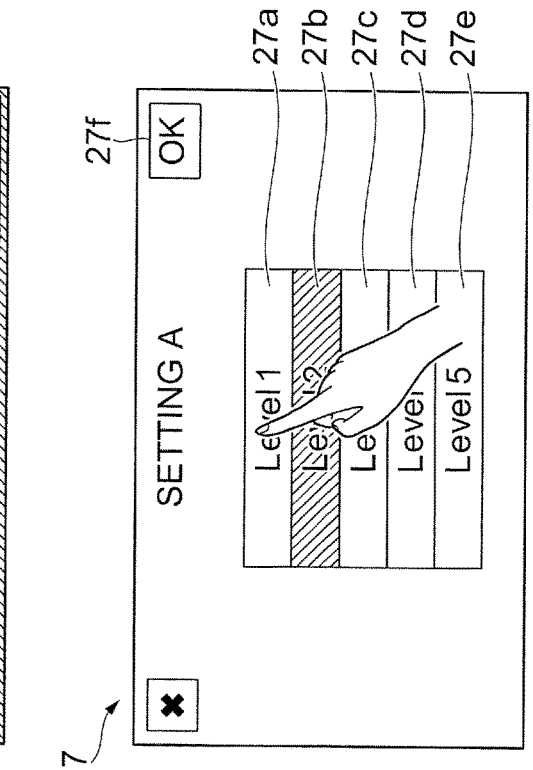
Figure 9C:
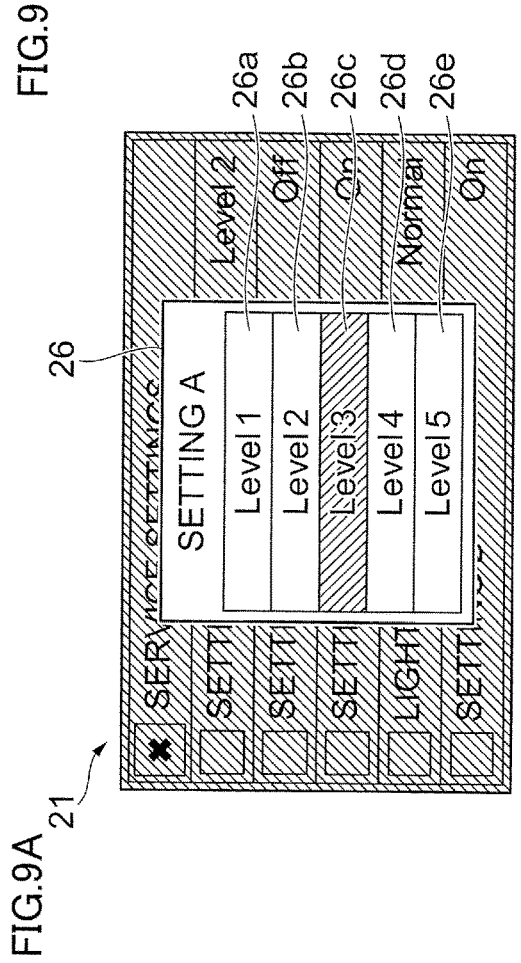
FIGS. 9C and 9D are diagrams showing another specific example of the setting screen in the second form.
Figure 9D:
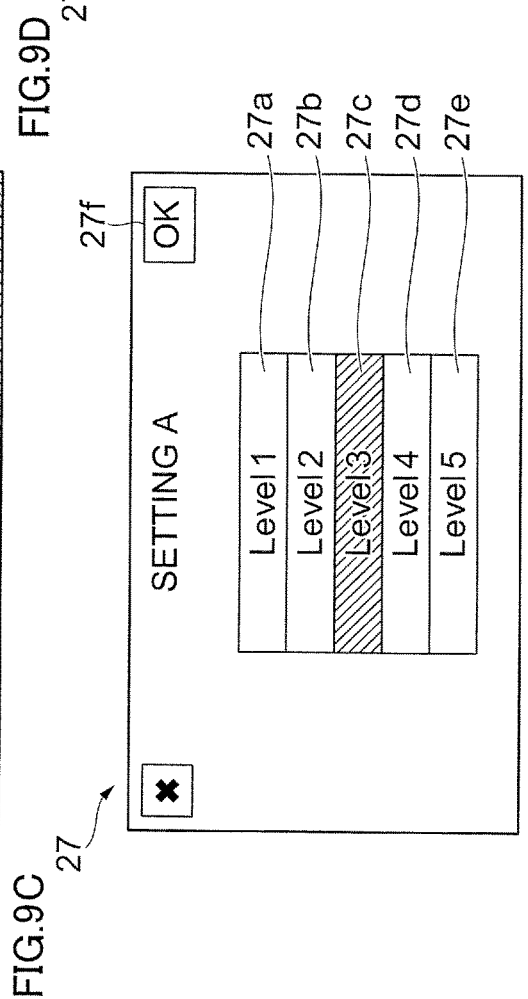

Next, other specific examples of the setting screen in the first form and the setting screen in the second form will be described. FIGS. 9A and 9B are diagrams showing another specific example of the setting screen in the first form. FIGS. 9C and 9D are diagrams showing another example of the setting screen in the second form. Here, a description will be given by taking a screen displayed after an operator selects the image 21a on the screen 21 shown in FIG. 3A as an example, A screen 26 shown in FIG. 9A performs setting about "Setting A", and is displayed to overlap the screen 21 that has already been displayed. On the screen 26, images 26a to 26e are provided as images corresponding to five setting items, "Level 1", "Level 2", "Level 3", "Level 4" and "Level 5", respectively. Moreover, at the time when the screen 26 is displayed, a hatched image 26c is selected; accordingly, the image 26c is displayed in a mode indicating a selected state. As the mode indicating a selected state, for example, a mode to display a background color different from the background colors of images of other setting items (the image 26a, the image 26b, the image 26d and the image 26e) can be provided.

Here, for example, when an operator moves his/her finger while touching the image 26c, the image to be selected shifts to follow the designated position. More specifically, the image to be selected shifts over the images 26c, 26b and 26a to follow the designated position. Moreover, when the operator removes his/her finger from the screen 26, the distance determination section 114 determines whether or not the image displayed in the selected state (here, any one of the images 26a to 26e) and the designated position upon termination are in a state of being separated by a distance longer than a predetermined distance.

For example, when the operator removes his/her finger from a state of touching the image 26a, if the image 26a is displayed in the selected state, the distance determination section 114 determines that the image displayed in the selected state and the designated position upon termination are within the predetermined distance. On the other hand, for example, when the operator removes his/her finger from the state of touching the image 26a, if the image 26b is displayed in the selected state as shown in FIG. 9B, the distance determination section 114 determines that the image displayed in the selected state and the designated position upon termination are in a state of being separated by a distance longer than the predetermined distance. In this case, similar to the specific example shown in FIG. 5B, the display controller 115 performs control to continue displaying of the screen 26 until the image displayed in the selected state and the designated position upon termination are brought into the state within the predetermined distance. Moreover, the display controller 115 may display the screen 24 in FIG. 5C or the screen 25 in FIG. 5D.

Moreover, a screen 27 shown in FIG. 9C also performs setting about "Setting A", similar to the screen 26. The screen 27 is displayed as a screen different from the screen 21 that has already been displayed. On the screen 27, images 27a to 27e are provided as images corresponding to five setting items, "Level 1", "Level 2", "Level 3", "Level 4" and "Level 5", respectively.

Here, for example, when an operator moves his/her finger while touching the image 27c, the image to be selected shifts to follow the designated position. More specifically, the image to be selected shifts over the images 27c, 27b and 27a to follow the designated position. Moreover, when the operator removes his/her finger from the screen 27 and selects a confirmation button 27f, the distance determination section 114 determines whether or not the image displayed in the selected state (here, any one of the images 27a to 27e) and the designated position upon termination are in a state of being separated by a distance longer than a predetermined distance.

For example, when the operator removes his/her finger from a state of touching the image 27a and thereafter selects the confirmation button 27f, if the image 27a is displayed in the selected state, the distance determination section 114 determines that the image displayed in the selected state and the designated position upon termination are within the predetermined distance. On the other hand, for example, when the operator removes his/her finger from the state of touching the image 27a and thereafter selects the confirmation button 27f, if the image 27b is displayed in the selected state as shown in FIG. 9D, the distance determination section 114 determines that the image displayed in the selected state and the designated position upon termination are in a state of being separated by a distance longer than the predetermined distance. In this case, similar to the specific example shown in FIG. 7B, the display controller 115 performs control to continue displaying of the screen 27 until the image displayed in the selected state and the designated position upon termination are brought into the state within the predetermined distance. Moreover, the display controller 115 may display the screen 24 in FIG. 5C or the screen 25 in FIG. 5D.

In this manner, the image processing apparatus 100 related to the exemplary embodiment observes the distance between the position designated by the operator and the displayed item, and, when the designation of moving is terminated in a state where the designated position and the displayed item are separated by a distance longer than the predetermined distance, the image processing apparatus 100 controls so that displaying of the setting screen in the first form or the setting screen in the second form is continued until the designated position upon termination and the displayed item come within the predetermined distance. Further, in the setting screen in the second form, when the operation to confirm the setting contents is performed in a state where the designated position and the displayed item are separated by a distance longer than the predetermined distance, the control is performed so that displaying of the setting screen in the second form is continued until the designated position upon termination and the displayed item come within the predetermined distance. In this manner, in the exemplary embodiment, since the screen is continuously displayed until the designated position upon termination and the displayed item come within the predetermined distance, occurrence of misrecognition about the setting by the operator can be suppressed.

Moreover, the image processing apparatus 100 may also display the screen showing setting contents set by designation from the operator or the screen for accepting input of setting by the operator, instead of waiting until the designated position upon termination and the displayed item come into a state within the predetermined distance. To put it another way, the image processing apparatus 100 performs control to continue displaying of the setting screen in the first form or the setting screen in the second form until a screen showing setting contents set by designation from an operator or a screen for accepting input of setting by an operator is displayed. By the control like this, even though the designation is terminated in a state where the displayed item has not moved to the position designated by the operator, the setting contents are displayed or input of setting by the operator is newly accepted; accordingly, occurrence of misrecognition about setting by the operator can be suppressed.

Moreover, in the exemplary embodiment, when the load of the CPU 101 exceeds the predetermined threshold value, the display controller 115 may display, instead of the setting screen in the first form, the screen for accepting input of setting by the operator, as the screen 25 shown in FIG. 5D.

<Description of Applicable Computer>

Figure 10:
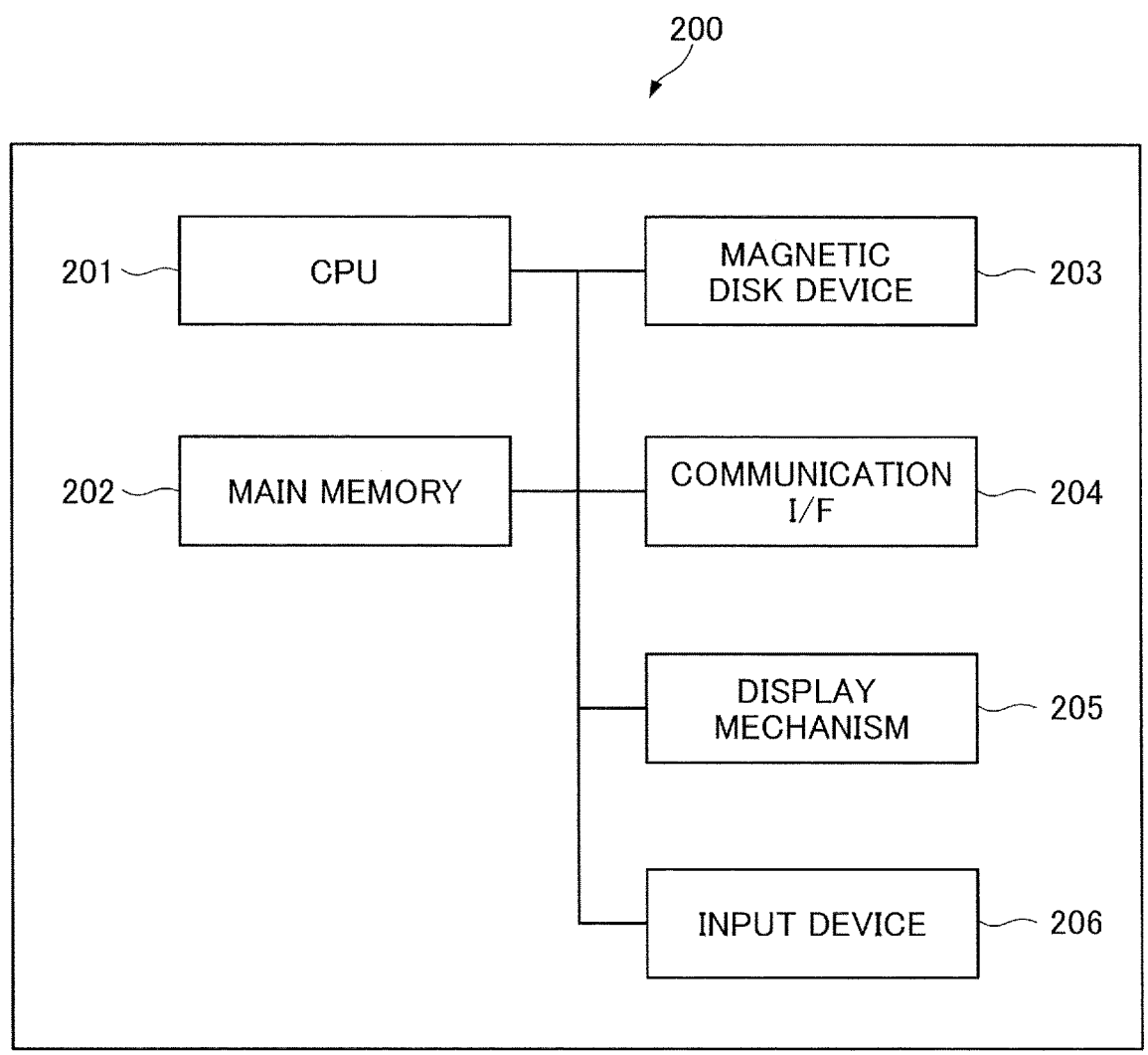
FIG. 10 is a diagram showing a hardware configuration example of a computer to which the exemplary embodiment can be applied.

The processing by the image processing apparatus 100 related to the exemplary embodiment may be implemented in a general-purpose computer. Therefore, assuming that the processing is implemented by a computer 200, a hardware configuration thereof will be described. FIG. 10 is a diagram showing a hardware configuration example of the computer 200 to which the exemplary embodiment can be applied. Note that, in the exemplary embodiment, the computer 200 is used as an example of the display device.

The computer 200 includes: a CPU 201, which is a computing unit; a main memory 202, which is a storing unit;

and a magnetic disk device (HDD) 203. Here, the CPU 201 executes various kinds of programs, such as an OS or applications. Moreover, the main memory 202 is a storage region for storing various kinds of programs or data used for executing the programs, and the magnetic disk device 203 stores programs for implementing respective functional sections shown in FIG. 2. The programs are loaded to the main memory 202 and processing based on the programs is executed by the CPU 201; and thereby each function is implemented.

Further, the computer 200 includes: a communication interface (I/F) 204 for performing communication with outside; a display mechanism 205 configured with a video memory, a display or the like; and an input device 206, such as a keyboard or a mouse.

Specifically, the CPU 201 reads the programs for implementing the operation detection section 111, the CPU load determination section 112, the display screen creation section 113, the distance determination section 114, the display controller 115 and the like, for example, from the magnetic disk device 203 into the main memory 202 and executes thereof, and accordingly, these functional sections are implemented.

Moreover, it is possible to provide programs that cause a computer to implement the exemplary embodiment according to the present invention by a communication tool, of course, and it is also possible to store thereof in a storage medium, such as a CD-ROM, to be provided.

The foregoing description of the present exemplary embodiment of the present invention has been provided for the purposes of illustration and description. It is not intended to be exhaustive or to limit the invention to the precise forms disclosed. Obviously, many modifications and variations will be apparent to practitioners skilled in the art. The present exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
   a screen that displays an item for setting a device connected to the display device, the screen being displayed in either a first form or a second form; and
   a controller that controls display of the screen, the controller comprising a processor and being configured to:
      determine whether a load of the processor exceeds a predetermined threshold;
      when the load of the processor does not exceed the predetermined threshold, control the screen to display in the first form; and
      when the load of the processor exceeds the predetermined threshold, control the screen to display in the second form;
      in a case where a user makes an instruction to move the item, move the item to follow a move operation and perform a setting change in accordance with the move operation;
      when the screen is displayed in the first form, and at a time of terminating the move operation, (i) determine whether a distance between a position to which the item is instructed to be moved to and a position of the item is greater than a predetermined distance; and (ii) when it is determined that the distance is greater than the predetermined distance, control the screen to not disappear continuously display in the first form until the item is moved to within the predetermined distance, and control the screen in the first form to disappear at a time of being moved to within the predetermined distance; and
      when the screen is displayed in the second form, and at a time of terminating the move operation, (i) determine whether a distance between a position to which the item is instructed to be moved to and a position of the item is greater than a predetermined distance; and (ii) when it is determined that the distance is greater than the predetermined distance, control the screen to continuously display in the second form until the item is moved to within the predetermined distance, and control the screen to disappear at a time of being moved to within the predetermined distance and upon detection of a confirmation operation on the screen that confirms the setting change.

2. The display device according to claim 1, wherein
   a setting operation by the user is accepted on the screen after terminating the move operation, and
   the setting operation confirms a setting item corresponding to the position to which the item is instructed to be moved.

3. The display device according to claim 2, wherein
   in the screen, a setting item corresponding to the position to which the item is instructed to be moved is determined in advance, and
   when an operation to cancel the setting item corresponding to the position to which the item is instructed to be moved at the time of terminating the move operation is not performed within a predetermined time, the controller performs processing assuming that the setting operation has been accepted.

4. The display device according to claim 1, wherein
   when the move operation is terminated in a state where the item and the position to which the item is instructed to be moved are within the predetermined distance, the controller performs control to clear the screen at a time of terminating the move operation.

5. The display device according to claim 4, wherein
   when the move operation is terminated in a state where the item has moved to the position to which the item is instructed to be moved, the controller performs control to clear the screen at the time of terminating the move operation.

6. An image processing apparatus comprising:
   an image processor that performs image processing;
   a screen that displays an item for setting the image processor, the screen being displayed in either a first form or a second form; and
   a controller that controls display of the screen, the controller comprising a processor and being configured to:
      determine whether a load of the processor exceeds a predetermined threshold;
      when the load of the processor does not exceed the predetermined threshold, control the screen to display in the first form; and
      when the load of the processor exceeds the predetermined threshold, control the screen to display in the second form;
      in a case where a user makes an instruction to move the item, move the item to follow a move operation and perform a setting change in accordance with the move operation;

when the screen is displayed in the first form, and at a time of terminating the move operation, (i) determine whether a distance between a position to which the item is instructed to be moved to and a position of the item is greater than a predetermined distance; and (ii) when it is determined that the distance is greater than the predetermined distance, control the screen to continuously display in the first form until the item is moved to within the predetermined distance, and control the screen in the first form to disappear at a time of being moved to within the predetermined distance; and when the screen is displayed in the second form, and at a time of terminating the move operation, (i) determine whether a distance between a position to which the item is instructed to be moved to and a position of the item is greater than a predetermined distance; and (ii) when it is determined that the distance is greater than the predetermined distance, control the screen to continuously display in the second form until the item is moved to within the predetermined distance, and control the screen to disappear at a time of being moved to within the predetermined distance and upon detection of a confirmation operation on the screen that confirms the setting change.

7. A display method comprising:

outputting data for displaying a screen that displays an item for setting a device, the screen being displayed in either a first form or a second form, and the screen being controlled by a controller comprising a processor;

determining whether a load of the processor exceeds a predetermined threshold;

when the load of the processor does not exceed the predetermined threshold, controlling the screen to display in the first form;

when the load of the processor exceeds the predetermined threshold, controlling the screen to display in the second form;

in a case where a user makes an instruction to move the item, moving the item to follow a move operation and performing a setting change in accordance with the move operation;

when the screen is displayed in the first form, and at a time of terminating the move operation, (i) determining whether a distance between a position to which the item is instructed to be moved to and a position of the item is greater than a predetermined distance; and (ii) when it is determined that the distance is greater than the predetermined distance, controlling the screen to continuously display in the first form until the item is moved to within the predetermined distance, and controlling the screen in the first form to disappear at a time of being moved to within the predetermined distance; and when the screen is displayed in the second form, and at a time of terminating the move operation, (i) determining whether a distance between a position to which the item is instructed to be moved to and a position of the item is greater than a predetermined distance; and (ii) when it is determined that the distance is greater than the predetermined distance, controlling the screen to continuously display in the second form until the item is moved to within the predetermined distance, and controlling the screen to disappear at a time of being moved to within the predetermined distance and upon detection of a confirmation operation on the screen that confirms the setting change.

8. A non-transitory computer readable medium storing a program that causes a computer to execute a process, the process comprising:

outputting data for displaying a screen that displays an item for setting a device, the screen being displayed in either a first form or a second form, and the screen being controlled by a controller comprising a processor;

determining whether a load of the processor exceeds a predetermined threshold;

when the load of the processor does not exceed the predetermined threshold, controlling the screen to display in the first form;

when the load of the processor exceeds the predetermined threshold, controlling the screen to display in the second form;

in a case where a user makes an instruction to move the item, moving the item to follow a move operation and performing a setting change in accordance with the move operation;

when the screen is displayed in the first form, and at a time of terminating the move operation, (i) determining whether a distance between a position to which the item is instructed to be moved to and a position of the item is greater than a predetermined distance; and (ii) when it is determined that the distance is greater than the predetermined distance, controlling the screen to continuously display in the first form until the item is moved to within the predetermined distance, and controlling the screen in the first form to disappear at a time of being moved to within the predetermined distance; and when the screen is displayed in the second form, and at a time of terminating the move operation, (i) determining whether a distance between a position to which the item is instructed to be moved to and a position of the item is greater than a predetermined distance; and (ii) when it is determined that the distance is greater than the predetermined distance, controlling the screen to continuously display in the second form until the item is moved to within the predetermined distance, and controlling the screen to disappear at a time of being moved to within the predetermined distance and upon detection of a confirmation operation on the screen that confirms the setting change.

\* \* \* \* \*